(12) United States Patent
Wu

(10) Patent No.: US 12,259,000 B2
(45) Date of Patent: Mar. 25, 2025

(54) PIVOTING MECHANISM FOR SPRING HINGE

(71) Applicants: JYI HSING ENTERPRISE CO., LTD., Changhwa (TW); Chun-Yu Wu, Changhwa (TW)

(72) Inventor: Chien-Cheng Wu, Changhwa (TW)

(73) Assignees: JYI HSING ENTERPRISE CO., LTD., Changhwa (TW); Chun-Yu Wu, Changhwa (TW)

( * ) Notice: Subject to any disclaimer, the term of this patent is extended or adjusted under 35 U.S.C. 154(b) by 106 days.

(21) Appl. No.: 18/446,174

(22) Filed: Aug. 8, 2023

(65) Prior Publication Data

US 2025/0052274 A1  Feb. 13, 2025

(51) Int. Cl.
| | |
|---|---|
| E05D 5/10 | (2006.01) |
| E05D 11/00 | (2006.01) |
| F16C 11/04 | (2006.01) |
| E05F 1/12 | (2006.01) |

(52) U.S. Cl.
CPC .......... *F16C 11/04* (2013.01); *E05D 11/0054* (2013.01); *E05D 2011/0063* (2013.01); *E05F 1/12* (2013.01)

(58) Field of Classification Search
CPC ....... E05D 5/10; E05D 3/02; E05D 2005/102; E05D 11/02; E05D 11/0054; E05D 2011/0063; E05D 5/128; E05D 5/12; E05D 5/125; E05D 26/06; E05Y 2900/132; E05Y 2900/531; E05Y 2600/622; F16C 11/0604; F16C 11/907; E05F 1/12
See application file for complete search history.

(56) References Cited

U.S. PATENT DOCUMENTS

| | | | | |
|---|---|---|---|---|
| 1,175,550 A | * | 3/1916 | Murry ................... | F16B 41/002 403/217 |
| 2,817,871 A | * | 12/1957 | Chamberlain ........ | E05D 7/1022 16/263 |
| 3,013,297 A | * | 12/1961 | Chamberlain ........ | E05D 7/1022 16/263 |

(Continued)

FOREIGN PATENT DOCUMENTS

| | | | |
|---|---|---|---|
| CN | 106931030 A | * | 7/2017 |
| DE | 2524339 A1 | * | 12/1976 |

(Continued)

*Primary Examiner* — Chuck Y Mah
(74) *Attorney, Agent, or Firm* — MUNCY, GEISSLER, OLDS & LOWE, P.C.

(57) ABSTRACT

A pivoting mechanism for a spring hinge includes a pin and at least one cap assembly. The pin defines an axial direction and is configured to be disposed through a barrel portion of the spring hinge. The at least one cap assembly is disposed on an end of the pin and includes a cap body, a restricting member and an engaging member. The cap body includes a first abutting wall lateral to the axial direction, a first circumferential wall extending around the axial direction and connected with the first abutting wall and a groove recessed on an inner surface of the first circumferential wall. The restricting member is embedded within the groove and radially protrudes beyond the inner surface. The engaging member surrounds the pin and is disposed between the restricting member and the first abutting wall.

15 Claims, 4 Drawing Sheets

(56) References Cited

U.S. PATENT DOCUMENTS

| | | | | |
|---|---|---|---|---|
| 3,135,013 | A | * | 6/1964 | Parsons ............ E05D 5/12 |
| | | | | 16/259 |
| 3,152,356 | A | * | 10/1964 | Parsons ............ E05D 5/127 |
| | | | | 16/259 |
| 4,751,765 | A | * | 6/1988 | Wu ............ E05F 1/1215 |
| | | | | 16/256 |
| 6,256,839 | B1 | * | 7/2001 | Wu ............ E05F 1/1215 |
| | | | | 16/302 |
| 11,091,946 | B2 | * | 8/2021 | Wu ............ E05D 3/12 |
| 2003/0101539 | A1 | * | 6/2003 | Fang ............ E05D 3/08 |
| | | | | 16/302 |
| 2004/0020011 | A1 | * | 2/2004 | Fang ............ E05F 1/1215 |
| | | | | 16/302 |
| 2010/0146734 | A1 | * | 6/2010 | Munson ............ E05D 5/121 |
| | | | | 16/337 |
| 2016/0040468 | A1 | * | 2/2016 | Nagl ............ E05F 5/10 |
| | | | | 16/50 |
| 2024/0401389 | A1 | * | 12/2024 | Boland ............ E05D 3/02 |

FOREIGN PATENT DOCUMENTS

| | | | | |
|---|---|---|---|---|
| DE | 102014013586 | A1 * | 9/2015 | ............ E05D 3/02 |
| JP | 4014171 | B2 * | 11/2007 | |
| WO | WO-8800272 | A * | 1/1988 | ............ E05D 11/1007 |

* cited by examiner

PIVOTING MECHANISM FOR SPRING HINGE

BACKGROUND OF THE INVENTION

Field of the Invention

The present invention relates to a pivoting mechanism for a spring hinge.

Description of the Prior Art

A conventional spring hinge includes at least one barrel portion and two leafs connected with the at least one barrel portion, and a pin of the spring hinge is restricted to one said barrel portion by two cap assemblies. The at least one barrel portion has a spring mechanism disposed thereon so that the two leafs are rotatable relative to each other and can automatically return to their original positions.

Specifically, each of the two cap assemblies includes an engaging member engaged with an end of the pin and a cover member covering the engaging member. The cover member is extruded and deformed to cover on an outer side of the engaging member by a processing machine so that the pin, the engaging member and the cover member are non-rotatably connected with one another. For easy assembling, the cover member should be selected from a metal material which is thin and easy to deform. However, the cover member is easy to deform unexpectedly and rotatable relative to the engaging member in long-term use, and the pin and the two cap assemblies cannot be stably connected with one another, which may lead to problems such as damage to the spring hinge, unsmooth swing of the two leafs and poor reset effect.

The present invention is, therefore, arisen to obviate or at least mitigate the above-mentioned disadvantages.

SUMMARY OF THE INVENTION

The main object of the present invention is to provide a pivoting mechanism for a spring hinge, which has good structural strength and is durable to use.

To achieve the above and other objects, the present invention provides a pivoting mechanism for spring hinge, including: a pin and at least one cap assembly. The pin defines an axial direction and is configured to be disposed through a barrel portion of the spring hinge. The at least one cap assembly is disposed on an end of the pin and includes a cap body, a restricting member and an engaging member. The cap body includes a first abutting wall lateral to the axial direction, a first circumferential wall extending around the axial direction and connected with the first abutting wall and a groove recessed on an inner surface of the first circumferential wall. The restricting member is embedded within the groove and radially protrudes beyond the inner surface. The engaging member surrounds the pin and is disposed between the restricting member and the first abutting wall.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
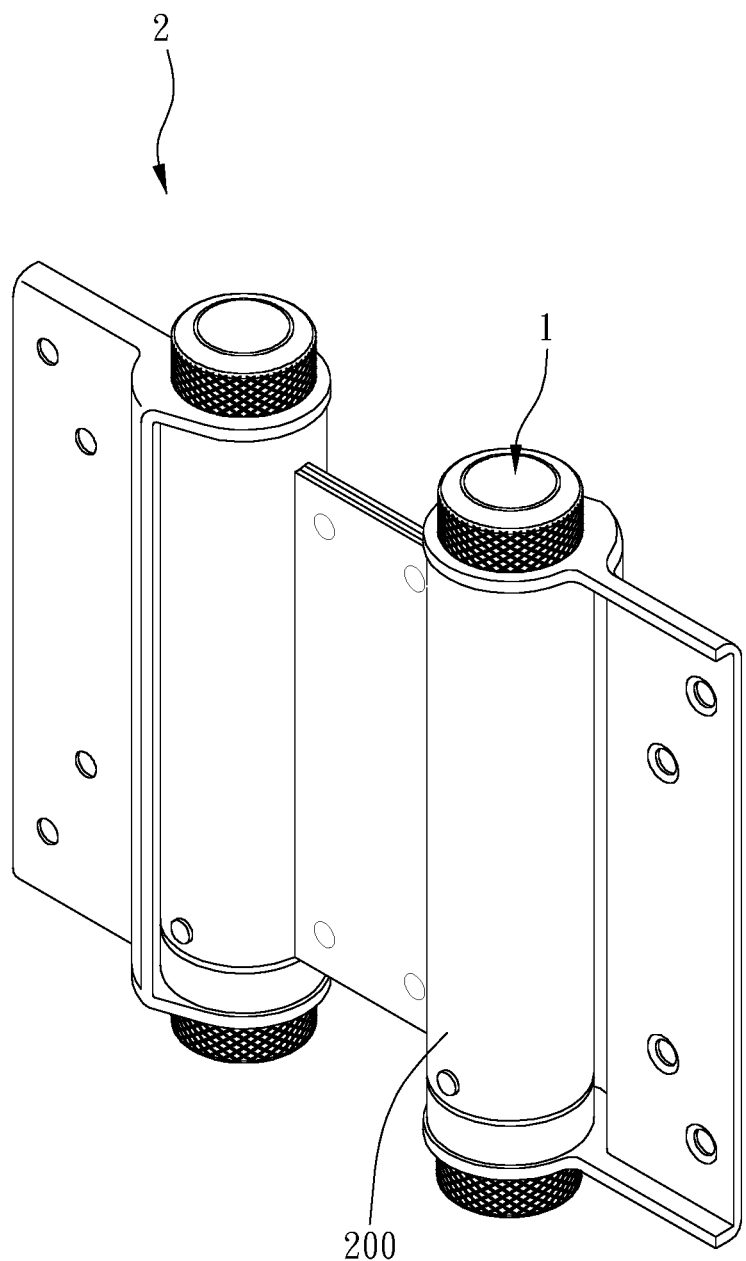
FIG. 1 is a stereogram of a preferable embodiment of the present invention.
Figure 2:
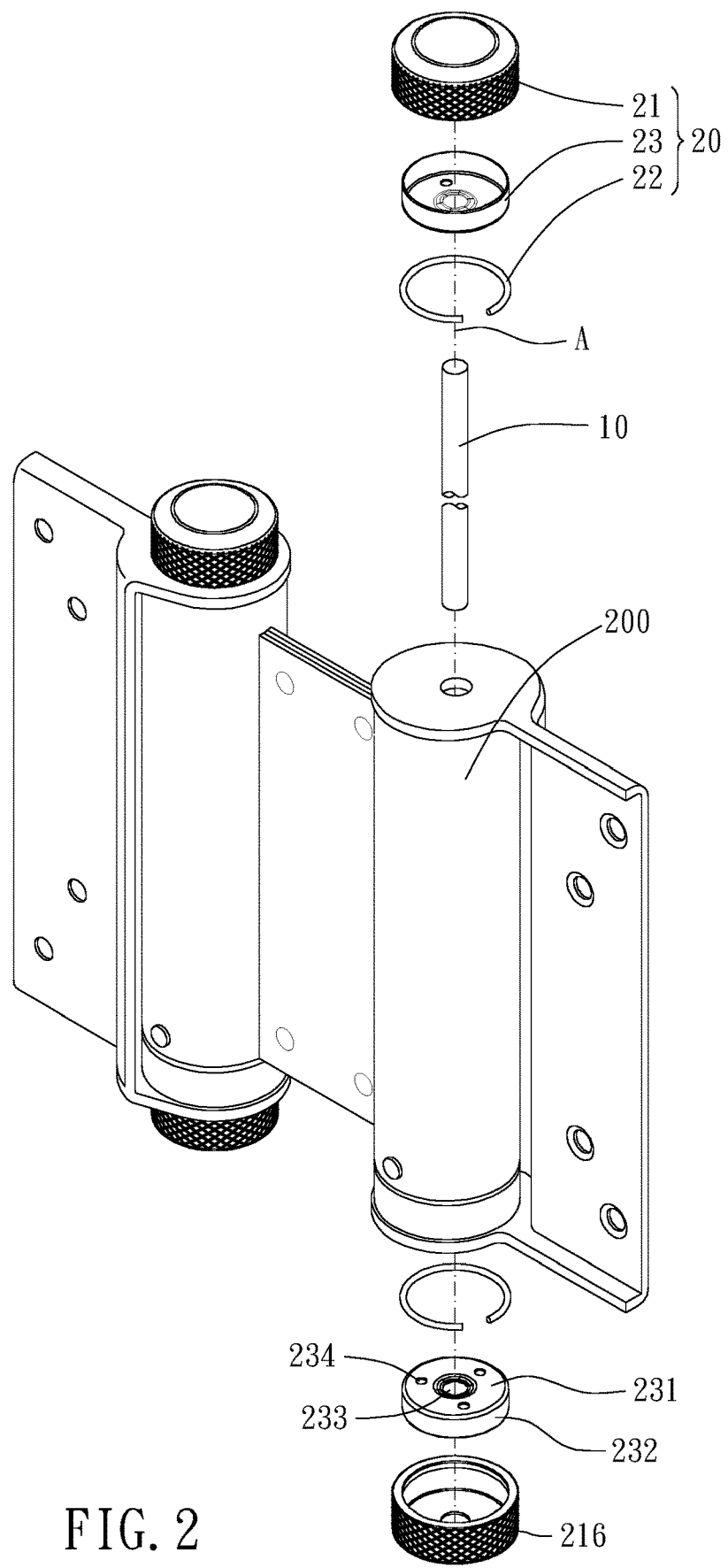
FIG. 2 is a breakdown drawing of a preferable embodiment of the present invention.
Figure 3:
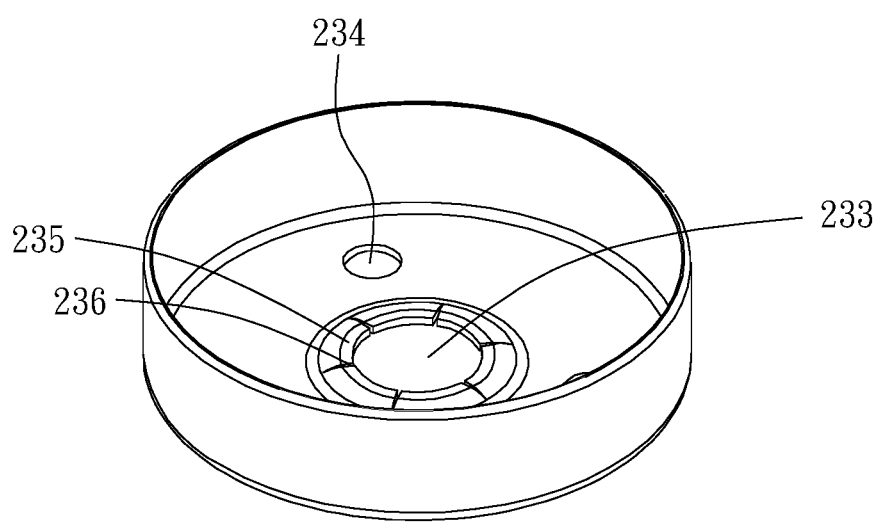
FIG. 3 is a stereogram of an engaging member according to a preferable embodiment of the present invention.

Please refer to FIGS. 1 to 5 for a preferable embodiment of the present invention. A pivoting mechanism 1 for a spring hinge 2 of the present invention includes a pin 10 and at least one cap assembly 20.

The pin 10 defines an axial direction A and is configured to be disposed through a barrel portion 200 of the spring hinge. The at least one cap assembly 20 is disposed on an end of the pin 10 and includes a cap body 21, a restricting member 22 and an engaging member 23. The cap body 21 includes a first abutting wall 211 lateral to the axial direction A, a first circumferential wall 212 extending around the axial direction A and connected with the first abutting wall 211 and a groove 213 recessed on an inner surface of the first circumferential wall 212. The restricting member 22 is embedded within the groove 213 and radially protrudes beyond the inner surface, and the engaging member 23 surrounds the pin 10 and is disposed between the restricting member 22 and the first abutting wall 211. As such, the pivoting mechanism 1 has good structural strength and is easy to assemble and durable to use.

Figure 5:
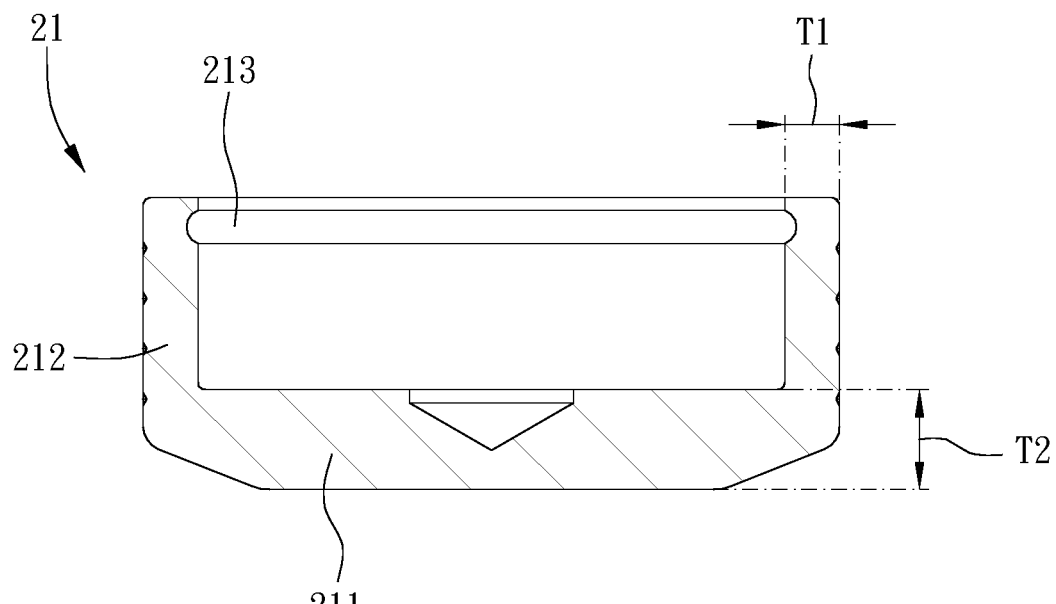
FIG. 5 is a cross-sectional view of a cap body according to a preferable embodiment of the present invention.

Specifically, an extending direction of the first circumferential wall 212 is vertical to an extending direction of the first abutting wall 211, which is convenient to be assembled with the engaging member 23 and provides preferable appearance. A hardness of the cap body 21 is respectively greater than a hardness of the engaging member 23 and a hardness of the restricting member 22; a radial thickness T1 of the first circumferential wall 212 is larger than or equal to 1.5 mm, and a thickness T2 of the first abutting wall 211 in the axial direction A is larger than or equal to 1.5 mm. Therefore, the cap body 21 has good structural strength and is not easy to deform. In this embodiment, the radial thickness T1 of the first circumferential wall 212 is larger than or equal to 2 mm, the thickness T2 of the first abutting wall 211 in the axial direction A is larger than or equal to 3 mm, and the thickness T2 of the first abutting wall 211 is larger than the radial thickness T1 of the first circumferential wall 212, as shown in FIG. 5, which is easy to manufacture and has good structural strength.

Figure 4:
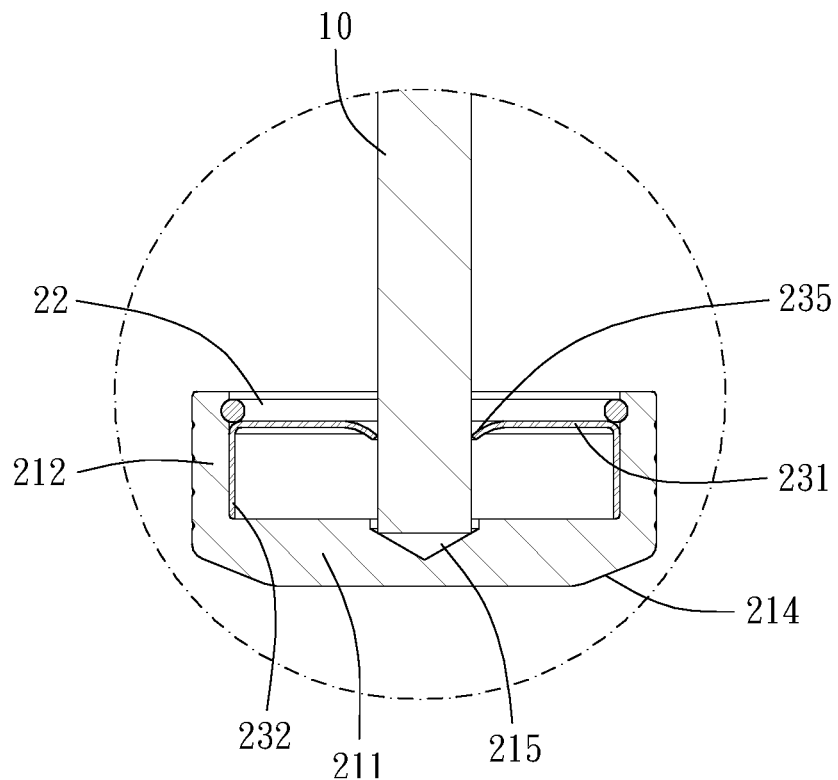
FIG. 4 is a partial cross-sectional view of a preferable embodiment of the present invention.

Please refer to FIG. 4, an outer surface of the first abutting wall 211 remote from the first circumferential wall 212 has an inclined surface 214 annularly disposed thereon for good appearance. A side of the first abutting wall 211 configured to face toward the barrel portion 200 has a recession 215 disposed thereon, and the end of the pin 10 is received within the recession 215 so as to avoid misalignment. In this embodiment, the recession 215 is a blind groove, and a diametrical dimension of the recession 215 is gradually decreased in the axial direction A toward a side of the first abutting wall 211 remote from the groove 213. In this way, the end of the pin 10 is abuttable against a bottom surface of the recession 215, and the cap body 21 is applicable to one of said pins with different diametrical dimensions. The cap body 21 may be made by die casting or cutting so that it can be processed into the expected shape according to the design requirements and can have one of a variety of appearances. Preferably, the cap body 21 is made by zinc alloy die casting so as to provide advantages of corrosion resistance, wear resistance and good strength. Preferably, an outer surface of the first circumferential wall 212 has an anti-slip structure 216 disposed thereon, and the anti-slip structure 216 may be a knurled pattern, a plurality of ribs or bumps spaced apart from one another, which allows hands or fingers to get a better grip during assembling.

The restricting member 22 is an annular retainer (such as a C-shaped retainer), and the groove 213 is an annular groove extending around the axial direction A, which has a simple structure and provides stable engagement, and is easy to process and assemble. A distance that the restricting member 22 radially protruding beyond the inner surface of the first circumferential wall 212 is larger than or equal to 0.3 mm so that the restricting member 22 is stably blocked with the engaging member 23 in the axial direction A. A depth of the groove 213 is preferably larger than or equal to 0.3 mm and is smaller than or equal to ⅓ of a radial thickness of the first circumferential wall 212, which allows the restricting member 22 to be stably engaged therewithin and maintains a structural strength of the first circumferential wall 212.

The engaging member 23 includes a second abutting wall 231 and a second circumferential wall 232 extending around the axial direction A and connected with the second abutting wall 231, and the second circumferential wall 232 is radially abutted against the first circumferential wall 212 in tight-fit. The second circumferential wall 232 is abutted against the first abutting wall 211 in the axial direction A; preferably, in the axial direction A, the first abutting wall 211, the restricting member 22 and the engaging member 23 are tightly abutted against one another, which effectively prevents the engaging member 23 and the cap body 21 from being rotated relative to each other for stable assembling. Moreover, a surface of the engaging member 23 has a coating disposed thereon so as to avoid oxidation and rust. The engaging member 23 includes a through hole 233 extending in the axial direction A and at least one penetrating hole 234 eccentric to the axial direction A, and the pin 10 is disposed through the through hole 233. The second abutting wall 231 includes a plurality of extending pieces 235 and a plurality of slots 236 which are alternatively arranged around the axial direction A, the plurality of extending pieces 235 extend toward the first abutting wall 211 and define the through hole 233, and each of the plurality of slots 236 is communicated with the through hole 233. When the end of the pin 10 penetrates through the through hole 233, the plurality of extending pieces 235 are bent and deformed to be radially biased against an outer circumferential surface of the pin 10, which prevents the pin 10 from being rotated relative to the at least one cap assembly 20 for stable connection. The at least one penetrating hole 234 prevents the second abutting wall 231 from unexpected deformation due to radial extrusion during assembling, and is used as a drainage channel in the process of forming the coating.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pivoting mechanism for a spring hinge, including:
a pin, defining an axis extending in an axial direction, configured to be disposed through a barrel portion of the spring hinge; and
at least one cap assembly, disposed on an end of the pin, including a cap body, a restricting member and an engaging member, the cap body including a first abutting wall lateral to the axis, a first circumferential wall extending around the axis and connected with the first abutting wall and a groove recessed on an inner surface of the first circumferential wall, the restricting member embedded within the groove and radially protruding beyond the inner surface, the engaging member surrounding the pin and disposed between the restricting member and the first abutting wall.

2. The pivoting mechanism for the spring hinge of claim 1, wherein an extending direction of the first circumferential wall is vertical to an extending direction of the first abutting wall.

3. The pivoting mechanism for the spring hinge of claim 1, wherein a radial thickness of the first circumferential wall is larger than or equal to 1.5 mm.

4. The pivoting mechanism for the spring hinge of claim 1, wherein a thickness of the first abutting wall in the axial direction is larger than or equal to 1.5 mm.

5. The pivoting mechanism for the spring hinge of claim 1, wherein a thickness of the first abutting wall in the axial direction is larger than a radial thickness of the first circumferential wall.

6. The pivoting mechanism for the spring hinge of claim 1, wherein a side of the first abutting wall configured to face toward the barrel portion has a recession disposed thereon, and the end of the pin is received within the recession.

7. The pivoting mechanism for the spring hinge of claim 6, wherein a diametrical dimension of the recession is gradually decreased in the axial direction toward a side of the first abutting wall remote from the groove.

8. The pivoting mechanism for the spring hinge of claim 7, wherein an extending direction of the first circumferential wall is vertical to an extending direction of the first abutting wall; a radial thickness of the first circumferential wall is larger than or equal to 2 mm; a thickness of the first abutting wall in the axial direction is larger than or equal to 3 mm; the thickness of the first abutting wall is larger than the radial thickness of the first circumferential wall; the engaging member includes a second abutting wall and a second circumferential wall extending around the axis and connected with the second abutting wall, and the second circumferential wall is radially abutted against the first circumferential wall in tight-fit; the second circumferential wall is abutted against the first abutting wall in the axial direction; in the axial direction, the first abutting wall, the restricting member and the engaging member are tightly abutted against one another; the restricting member is a C-shaped retainer, the groove is an annular groove extending around the axis; a depth of the groove is larger than or equal to 0.3 mm and is smaller than or equal to ⅓ of a radial thickness of the first circumferential wall; a distance that the restricting member radially protruding beyond the inner surface of the first circumferential wall is larger than or equal to 0.3 mm; the engaging member includes a through hole extending in the axial direction and at least one penetrating hole eccentric to the axis, and the pin is disposed through the through hole; the second abutting wall includes a plurality of extending pieces and a plurality of slots which are alternatively arranged around the axis, the plurality of extending pieces extend toward the first abutting wall and define the through hole, and each of the plurality of slots is communicated with the through hole; a surface of the engaging member has a coating disposed thereon; an outer surface of the first circumferential wall has an anti-slip structure disposed thereon; and an outer surface of the first abutting wall remote from the first circumferential wall has an inclined surface annularly disposed thereon.

9. The pivoting mechanism for the spring hinge of claim 1, wherein the engaging member includes a second abutting wall and a second circumferential wall extending around the axis and connected with the second abutting wall, and the second circumferential wall is radially abutted against the first circumferential wall in tight-fit.

10. The pivoting mechanism for the spring hinge of claim 9, wherein the second circumferential wall is abutted against the first abutting wall in the axial direction.

11. The pivoting mechanism for the spring hinge of claim 1, wherein the restricting member is an annular retainer, and the groove is an annular groove extending around the axis.

12. The pivoting mechanism for the spring hinge of claim 11, wherein a depth of the groove is larger than or equal to 0.3 mm and is smaller than or equal to ⅓ of a radial thickness of the first circumferential wall.

13. The pivoting mechanism for the spring hinge of claim 1, wherein the engaging member includes a through hole extending in the axial direction and at least one penetrating hole eccentric to the axis, and the pin is disposed through the through hole.

14. The pivoting mechanism for the spring hinge of claim 1, wherein in the axial direction, the first abutting wall, the restricting member and the engaging member are tightly abutted against one another.

15. The pivoting mechanism for the spring hinge of claim 1, wherein a hardness of the cap body is respectively greater than a hardness of the engaging member and a hardness of the restricting member.

* * * * *